Aug. 9, 1960    A. L. NYLANDER    2,948,853
MULTI-RANGE HOOK-ON ELECTRICAL INDICATING INSTRUMENT
Filed Feb. 13, 1958    2 Sheets-Sheet 1

Inventor:
Arnold L. Nylander
by Richard E. Hosley
His Attorney

Aug. 9, 1960  A. L. NYLANDER  2,948,853
MULTI-RANGE HOOK-ON ELECTRICAL INDICATING INSTRUMENT
Filed Feb. 13, 1958  2 Sheets-Sheet 2

Inventor:
Arnold L. Nylander
by Richard E. Horley
His Attorney

United States Patent Office 2,948,853
Patented Aug. 9, 1960

2,948,853

MULTI-RANGE HOOK-ON ELECTRICAL INDICATING INSTRUMENT

Arnold L. Nylander, Swampscott, Mass., assignor to General Electric Company, a corporation of New York Filed Feb. 13, 1958, Ser. No. 715,018

7 Claims. (Cl. 324—115)

My invention relates to a multi-range electrical indicating instrument in the hook-on type, and more particularly to means for extending the range thereof.

It is frequently necessary or desirable to incorporate in electrical indicating instruments of the hook-on type a plurality of ranges when accuracy and ease of reading is required. When a single range meter is utilized to indicate both high and low electrical values, the highest value to be measured necessarily determines the single range. In such an instrument, it becomes practically impossible accurately to differentiate between a plurality of low value indications. Additional indicating instruments with lower full-scale values could be used to obtain the desired accuracy but such a solution is uneconomical and at times impractical in that additional instruments must be connected into the circuit. It is therefore common practice to provide a single indicating instrument with a plurality of intermediate ranges. Ammeter range switching methods presently in use provide a multi-position switch to enable the selective connection from a plurality of precision resistors of the required meter shunt resistance for the desired range. Such a switching arrangement is necessarily relatively complex and costly. In operation, it often becomes necessary to switch to a higher range as the current under measurement increases. If the instrument is inadvertently turned to a lower range, the sudden large increase of current through the meter may result in damage to the meter.

It is an object of my invention to provide an improved range extending resistance unit in the ammeter circuit of a hook-on type of volt-ammeter.

It is another object of my invention to provide a range extending unit in a multi-range electrical indicating instrument which is less complex than those presently known and which eliminates the requirements of a separate precision resistor and a switching arrangement for each range.

It is a further object of my invention to provide a multi-range electrical indicating instrument in which the transition from one range to another is gradual so as to provide a timely indication whether the range being selected is of the desired magnitude and in which the ranges may be changed without interruption of the circuit in which such meter is connected.

It is a still further object of my invention to provide an improved range extending resistance unit to furnish a large number of ranges in an electrical indicating instrument in a minimum of space.

It is an additional object of my invention to provide an improved arrangement for obtaining current measurements in a hook-on type of ammeter.

Further objects and advantages of my invention will become apparent as the following description proceeds and the features of novelty which characterize my invention will be pointed out with particularity in the claims annexed to and forming a part of this specification.

In accordance with one form of my invention, a rheostat is connected in shunt with the indicating-meter of a multi-range electrical indicating instrument of the hook-on ammeter type, and adjustable stops are associated with the rheostat to facilitate the selection of the desired range.

For a better understanding of my invention, reference may be had to the accompanying drawings in which.

A common method presently utilized to obtain a plurality of current ranges in an A.C. hook-on type of ammeter, includes a meter connected in a conventional bridge circuit arrangement with a current coil or current transformer connected in the input circuit. A plurality of range extending resistances may be selectively connected in shunt with the bridge circuit through operation of a range selection switch. The current induced in the current coil divides between the bridge circuit and the shunt resistance in inverse proportion to the value of the impedance of each path. A higher value of shunt resistance will cause a smaller proportionate amount of the total current to pass through the shunt and a larger proportionate amount to pass through the meter in the bridge circuit, providing a lower current range. On the lower current ranges, a given incremental change of current will cause a larger proportionate change of the meter reading than on a higher range, resulting in improved accuracy of readings on the lower ranges, as compared with such readings obtained on a higher range.

The shunt resistance values are usually selected to provide ranges which are sub-multiples of one another so that a minimum number of scales can be utilized for a plurality of ranges. The accuracy of the readings obtainable depends upon the accuracy of each shunt resistance requiring the provision of a precision resistance or adjustment means for each shunt ranged resistance.

Figure 1:
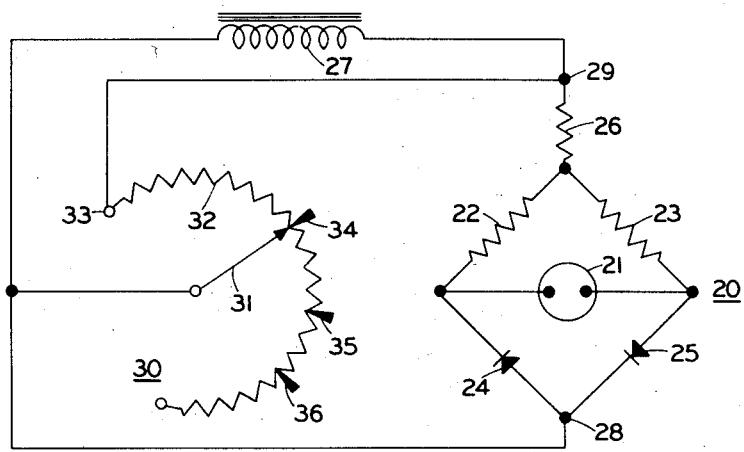
Figure 1 is a circuit diagram embodying my invention in a straight shunt arrangement for current indication.

My invention eliminates the requirements of the plurality of precision shunt resistances along with the range selection switch and the associated wiring necessary to interconnect the plurality of components, through use of an arrangement as illustrated schematically in Figure 1.

Referring to Figure 1, the indicating-meter 20 may conveniently comprise a D'Arsonval permanent-magnet moving-coil type of meter 21 utilized in a bridge circuit consisting of resistance arms 22 and 23, rectifier arms 24 and 25 and series limiting resistor 26. The term indicating-meter is used in this specification to mean the electrical indicator or meter along with its associated circuit, such as the circuit shown or any other arrangement well known in the art, utilized to indicate the magnitude of A.C. electrical values.

A variety of bridge circuits or other rectifying circuits in combination with a D.C. meter, an A.C. meter, or an oscilloscope can be substituted for the circuit shown. My invention is not intended to be, nor should it be, restricted to any particular type of indicating-meter.

The indicating-meter 20 is connected in shunt with current coil 27. Current coil 27 is associated with a hinged core type of current transformer commonly utilized in hook-on type of ammeters. Such a type of current transformer is illustrated only diagrammatically and may be any such transformer well known in the art.

In order to supply a continuously variable shunt resistance, rheostat 30 is provided. Rheostat 30 comprises an adjustable arm 31 connected to the indicating-meter input point 28 and a resistance element 32 with one end 33 connected to the other indicating meter input point 29.

Figure 3:
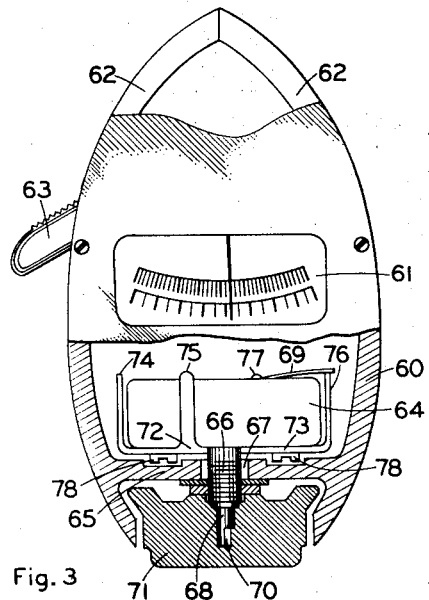
Figure 3 is a partial sectional view illustrating the physical construction of one embodiment of my invention.

In operation, the current induced in coil 27 divides between the indicating-meter 20 and that portion of resistance element 32 between the arm 31 and end 33 in inverse proportion to their impedances. The portion of the resistance element 32 required to set the instrument to the desired current range is selected by the positioning of arm 31. The exact position is facilitated through use of a plurality of mechanical range stops or tabs such as 34, 35, and 36 which will be more fully described under the discussion of Figures 3 and 4. The circuit arrangement as illustrated by Figure 1 in which the current coil, shunt resistance and indicating-meter are all in direct shunt relationship is commonly referred to as a straight shunt circuit.

Figure 2:
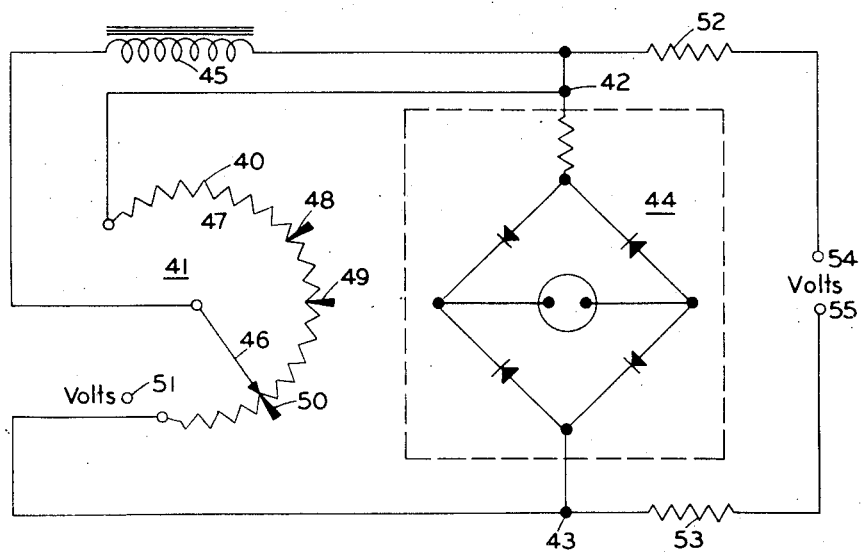
Figure 2 is a circuit diagram embodying my invention in a universal shunt arrangement for current indication and including voltage indication means.

Figure 2 illustrates another embodiment of my invention in which a universal shunt circuit is utilized in addition to the provision of voltage measuring means. Referring to Figure 2, the end terminals of the resistance element 40 of the rheostat 41 are connected directly in shunt with the input terminals 42 and 43 of the indicating-meter 44. The current coil 45 is connected between one input terminal 42 of the indicating-meter 44 and the arm 46 of rheostat 41.

In operation, the current induced in current coil 45 divides between the two paths shunting the current coil 45 in inverse proportion to the impedance of the paths. These paths are portion 47 of resistance element 40 between input terminal 42 and arm 46 and the remainder of the resistance element 40 plus the indicating-meter 44. Mechanical range stops 48, 49 and 50 are associated with the rheostat 41 in order to facilitate the subdividing of the resistance element 40 into finite ranges.

Provisions are included for utilization of the indicating-meter 44 as a voltmeter. Position 51 is provided on the rheostat 41 separated from the resistance element 40 in order to disconnect one end of the current coil 45 from the circuit during voltage measurements. The input terminals 42 and 43 of the indicating-meter 44 are connected respectively through series resistances 52 and 53 to the voltage input connections 54 and 55. Resistances 52 and 53 may be of the variable type in order to provide a plurality of voltage ranges. Alternatively, a single series resistance may be utilized in circuit with either of the input leads in place of the two resistances 52 and 53 illustrated. The volt-meter circuit of Figure 2 therefore utilizes the indicating-meter 44 shunted by resistance element 40 and in series with resistances 52 and 53 with the current coil 45 cut out of the circuit by arm 46 contacting position 51.

Figure 5:
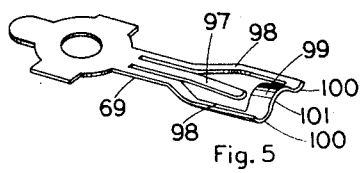
Figure 5 is a view showing the rotating arm thereof.
Figure 4:
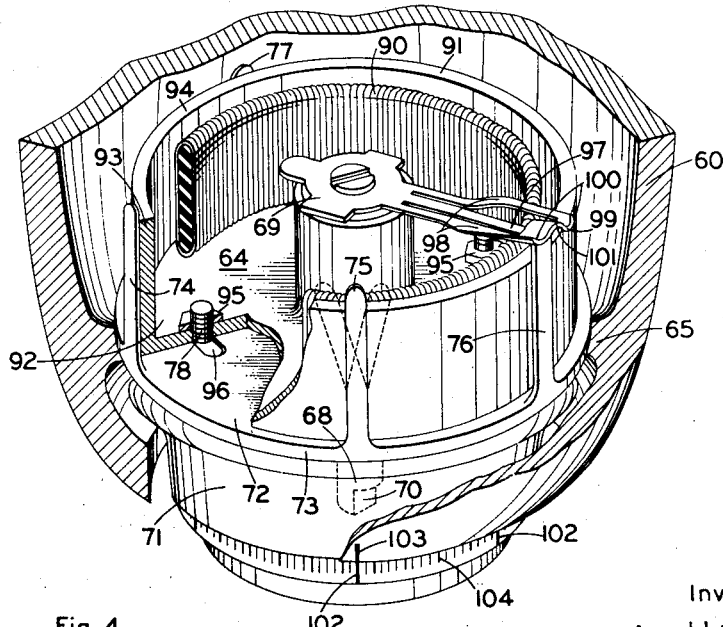
Figure 4 is an enlarged fragmentary sectional isometric view thereof.

The physical construction of a preferred embodiment of my invention is shown by Figures 4 and 5. Referring to Figures 4 and 5, the main housing shell 60 encloses the indicating-meter 61 and supports the hinged cores 62. Cores 62 are actuated by means of trigger 63 or any other manner well known in the art. The rheostat 64 is supported within the interior of the main housing shell 60 by transverse partition 65 and secured by means of the tubular threaded member 66 passing through opening 67 in the central portion of the transverse partition 65. Shaft 68 is rotatably disposed within the threaded member 66 and rigidly connected to the arm 69 of rheostat 64. Flatted portion 70 is provided at the lower end of shaft 68 to prevent relative rotation of shaft 68 and knob 71 which is provided to facilitate the adjustment of rheostat 64.

The construction of the rheostat 64 and its associated tab assembly 72 is best illustrated by reference to Figure 4. As illustrated by this figure, the tubular resistance element 90 is centrally disposed within a rheostat housing 91 which may conveniently be constructed of high impact type polystyrene. Rheostat housing 91 is constructed in the shape of an opened ended cylinder with the bottom plate 92 supporting the resistance element 90, the sides 93 concentrically spaced about the resistance element 90 and the rim 94 of the open end extending beyond the upper portion of the resistance element 90.

Disposed around rheostat 64 and interposed between the rheostat 64 and the main housing shell 60 is the mechanical range stop assembly or tab assembly 72. Tab assembly 72 comprises a bottom tab plate 73 and upright deformable members or tabs 74, 75, 76 and 77 set at approximately 90° with the tab plate 73 and circumferentially spaced around the rheostat 64 with the upper ends curved and extending beyond the rim 94 of the rheostat housing 91.

Tab assembly 72 is secured to the bottom of the rheostat housing 91 by suitable fastening means, such as screws 78 and nuts 95. Elongated slots 96 in the bottom plate 73 allow limited rotation of the tab assembly 72 relative to the rheostat housing 91 during the coarse adjustment of the instrument.

Rotatably mounted within the central region of the rheostat 64 is resilient conducting arm 69 which is secured to shaft 68. Arm 69, as best illustrated by Figure 5, comprises a central branch 97 contacting resistance element 90 and side branches 98 extending beyond the rim 94 of the rheostat housing 91 and terminating in an end portion 99. Side branches 98 have upturned rounded portions 100 to enable arm 69 to resiliently pass over the upper rounded ends of tabs 74, 75, 76 and 77 until the rounded detent 101 provided in the central region of end portion 99 cooperates with the rounded ends of the tabs to provide a mechanical stop.

Calibration of the instrument through use of the tab assembly 72 is accomplished by the following procedure in which tab 75 is assumed to be the tab associated with the lowest range:

(1) Pass the hinged cores 62 of the current transformer around a conductor (not shown) and pass the full scale current of the desired lowest range through the conductor.

(2) By means of knob 71, rotate the arm 69 until detent 101 engages the lowest range tab 75.

(3) Loosen the two tab assembly attaching screws 78 and circumferentially rotate the tab assembly 72 until the instrument is coarsely adjusted to full scale deflection as indicated on meter 61.

(4) Tighten the tab screws 78 by means of nuts 95 to prevent further relative rotation of tab assembly 72 and resistance element 90.

(5) Trim the full scale indication more accurately by mechanically bending the range tab 75. As indicated by the dotted lines associated with tab 75, the mechanically deformable tabs may be bent over a limited range in either direction tangential to the rheostat housing 91.

(6) By means of knob 71, rotate the arm 69 until detent 101 engages the next higher range tab 76. Pass the amount of current desired for the next higher full range scale through the conductor (not shown).

(7) Bend tab 76 until full scale deflection is indicated on meter 61.

(8) Repeat steps 6 and 7 for the remainder of the higher ranges.

To facilitate the later selection of the desired current range, knob 71 is marked at the correct positions on scale 102 relative to the index mark 103 which is provided in the central region of the lower periphery of main housing shell 60. The number of ranges available is theoretically infinite with a different current range for each position of the arm 69. In practice, the number of ranges is limited by the number of mechanical stops that can be provided, the space required and the reading confusion involved in adding adequate numerals to the scales of meter 61.

Another embodiment of my invention, as shown in Figure 4, provides a current scale distinct from the scales of meter 61. This scale can be calibrated to be direct reading in order to avoid the possibility of errors which often occur through readings taken on the wrong scale of a multi-scale meter. The direct reading scale 104 may conveniently be placed on knob 71 along with range indicator scale 102. The scale 104 is calibrated in the magnitude of current flow required to produce full scale deflection as indicated on meter 61. In operation, the hinged cores 62 are passed around a conductor (not shown) and the rheostat 64 is adjusted through rotation of knob 71 until the meter 61 indicates full scale. The value of current flowing through the conductor is then read directly from the scale 104.

If a scale on the meter 61 is calibrated in percent rather than merely utilizing a full scale indication, such a scale will always indicate the correct percentage of the current as indicated by scale 104. For example, if the direct reading scale 104 indicates 10 amperes and the scale on meter 61 indicates 40 percent, the true reading would be 40 percent of 10 amperes or 4 amperes. Alternatively, if the knob is now adjusted so that the indication on meter 61 is full scale or 100 percent, the true reading would be indicated directly on scale 104 as 4 amperes.

A single current scale 104 calibrated on the knob 71 can be used in combination with the tab assembly multi-range meter as described to provide an additional direct reading scale that cannot be easily confused with the plurality of scales on meter 61, or alternatively a single range ammeter could be constructed utilizing only scale 104 and meter 61 having only a full scale indication mark.

Having thus described my invention, it is to be understood that the foregoing disclosure relates only to preferred embodiments of my invention and that numerous modifications or alterations may be made therein without departing from the spirit and scope of my invention as set forth in the appended claims.

What I claim as new and desire to secure by Letters Patent of the United States is:

1. In a multi-range electrical indicator of the hook-on type, comprising a current coil, an indicating-meter in shunt with said current coil, and a resistance in shunt with said current coil to obtain the desired range of current indication; the improvement wherein said shunt resistance comprises a rheostat unit including only a single resistance element, a movable arm contacting said resistance element, and a plurality of adjustable stops positioned intermediate the ends of said resistance element and adapted to engage said movable arm, each of said stops establishing a respective meter range.

2. In a multi-range electrical indicator of the hook-on type, comprising a current coil, an indicating-meter in shunt with said current coil, and a rheostat in shunt with said current coil, the improvement wherein said rheostat comprises a single resistance element of arcuate configuration, a movable arm contacting said resistance element, a plurality of adjustable stops positioned intermediate the ends of said resistance element and linked by a rigid interconnecting member, said stops being constructed of deformable material and adapted to engage said movable arm, each of said stops establishing a respective meter range, and means to allow adjustment of said interconnecting member relative to said rheostat.

3. In an electrical indicator of the hook-on type, comprising a current coil, an indicating-meter in shunt with said current coil, and a rheostat in shunt with said current coil, the improvement wherein said rheostat comprises a single resistance element of substantially arcuate configuration, an insulating member surrounding said resistance element in close juxtaposition thereto and extending above the upper periphery of said resistance element, a plurality of deformable stop members circumferentially spaced about said insulating member in position intermediate the ends of said resistance element and having upper portions extending above the upper periphery of said insulating member and separated from said resistance element by said insulating member, and an arm rotatably disposed within the central region of said resistance element, said arm comprising a first member contacting said resistance element and a second member extending beyond the upper periphery of said insulating member and cooperating with the upper ends of said deformable members to provide adjustable stops for said arm, each of said stops establishing a respective meter range.

4. In an electrical indicator of the hook-on type, comprising a current coil, an indicating-meter in shunt with said current coil, and a rheostat in shunt with said current coil, the improvement wherein said rheostat comprises a single resistance element of substantially arcuate configuration, an insulating member surrounding said resistance element in close juxtaposition thereto with a portion extending above the upper periphery of said resistance element, a plurality of deformable stop members circumferentially spaced about said insulating member in positions intermediate the ends of said resistance element and having substantially arcuate upper end portions extending above the upper periphery of the portion of said insulating member and separated from said resistance element by said insulating member, and an arm rotatably disposed within the central region of said resistance element, said arm comprising a first member contacting said resistance element and a second member extending beyond the upper periphery of said insulating member and terminating in an end portion having up-turned edges and an arcuate detent therebetween to cooperatively slide over and engage said arcuate upper end portions of said deformable members, whereby said deformable members provide adjustable stops for said arm, each of said stops establishing a respective meter range.

5. In a multi-range electrical indicator of the hook-on type, comprising a current coil, an indicating-meter in shunt with said current coil, and a rheostat in shunt with said current coil, the improvement wherein said rheostat comprises a single resistance element, a movable arm contacting said resistance element, and a plurality of adjustable stops positioned intermediate the ends of said resistance element and adapted to engage said movable arm, each of said stops establishing a respective meter range, and the further improvement wherein means are provided to disconnect said current coil from in circuit with said indicating-meter, a first input means connected to one end of said meter, a second input means connected to the other end of said meter, said input means being adapted for connection across a source of voltage to be measured, whereby said indicating-meter will indicate the magnitude of said voltage.

6. In an electrical indicator of the hook-on type, comprising a current coil adapted to have induced therein an electric current proportional to that flowing in a conductor under test, an indicating-meter in shunt with said current coil, a rheostat including a single resistance element in shunt with said current coil, and an actuating member to adjust the magnitude of resistance thereof, the improvement wherein a scale is associated with said actuating member calibrated to indicate the magnitude of current flowing in the conductor under test when said indicating-meter indicates a predetermined value, and a plurality of adjustable stops are positioned intermediate the ends of said resistance element and adapted to engage said actuating member, each of said stops establishing a respective meter range of said indicating-meter.

7. In an electrical indicator of the hook-on type comprising a current coil adapted to have induced therein an electric current proportional to that flowing in a conductor under test, an indicating-meter in shunt with said current coil, a rheostat having a single resistance element in shunt with said current coil, an actuating member to adjust the magnitude of resistance thereof, the improvement wherein a scale is associated with said actuating member calibrated to indicate the magnitude of current flowing in the conductor under test when said indicating-meter indicates a predetermined value, and said rheostat comprises a movable arm contacting said resistance element and a plurality of adjustable stops positioned intermediate the ends of said resistance element, each of said stops establishing a respective range of said meter.

References Cited in the file of this patent

UNITED STATES PATENTS

| | | |
|---|---|---|
| 1,800,474 | Scherer | Apr. 14, 1931 |
| 2,198,371 | Wolfertz et al. | Apr. 23, 1940 |
| 2,362,372 | Halfmann | Nov. 7, 1944 |
| 2,448,783 | Giers et al. | Sept. 7, 1948 |
| 2,551,989 | Wilson | May 8, 1951 |